United States Patent [19]
Danford

[11] 4,450,918
[45] May 29, 1984

[54] DISCING TOOL POSITIONABLE TO BE TRANSPORTED

[76] Inventor: Jack D. Danford, Box 98, Watkins, Colo. 80137

[21] Appl. No.: 374,765

[22] Filed: May 4, 1982

[51] Int. Cl.³ .................... A01B 21/08; A01B 73/00
[52] U.S. Cl. .................... 172/583; 172/417; 172/588; 172/625; 172/662; 280/415 R
[58] Field of Search .............. 172/240, 248, 311, 456, 172/578, 580, 581, 582, 583, 584, 586, 587, 594, 595, 596, 625, 417, 662; 280/415 R, 415 A, 415 B

[56] References Cited

U.S. PATENT DOCUMENTS

| | | | |
|---|---|---|---|
| 3,292,716 | 12/1966 | Youngberg et al. | 172/595 |
| 3,481,408 | 12/1969 | Twidale | 172/311 |
| 3,610,661 | 10/1971 | Pierce et al. | 172/248 X |
| 3,901,327 | 8/1975 | Mitchell | 172/625 X |
| 4,127,283 | 11/1978 | Baden | 172/240 X |
| 4,157,735 | 6/1979 | Olsson et al. | 172/625 X |
| 4,223,743 | 9/1980 | Garrison | 172/311 X |

FOREIGN PATENT DOCUMENTS 2332690  6/1977  France .................... 172/248

Primary Examiner—Richard T. Stouffer
Attorney, Agent, or Firm—Fields, Lewis, Pittenger & Rost

[57] ABSTRACT

A discing tool is provided which includes a plurality of disc gangs connected to a movable elongated frame. The frame is supported on a number of rotatable wheel assemblies so that the disc gangs can be moved in a direction generally parallel to the longitudinal axis of the frame as well as in a direction generally perpendicular to the longitudinal axis of the frame. A pair of outer disc gangs are pivotally connected at their first ends to the center portion of the frame. The second ends of the outer disc gangs extend in opposite directions and the outer disc gangs can be positioned at various predetermined angles relative to the frame. A center disc gang is connected to the center portion of the frame and is vertically pivotal. When the discing tool is used to work the soil, the center disc gang disc harrows the section of soil between the first ends of the outer disc gangs. When the discing tool is transported, the center disc gang is postioned above the frame while the outer disc gangs are positioned adjacent the frame and substantially parallel thereto.

7 Claims, 7 Drawing Figures

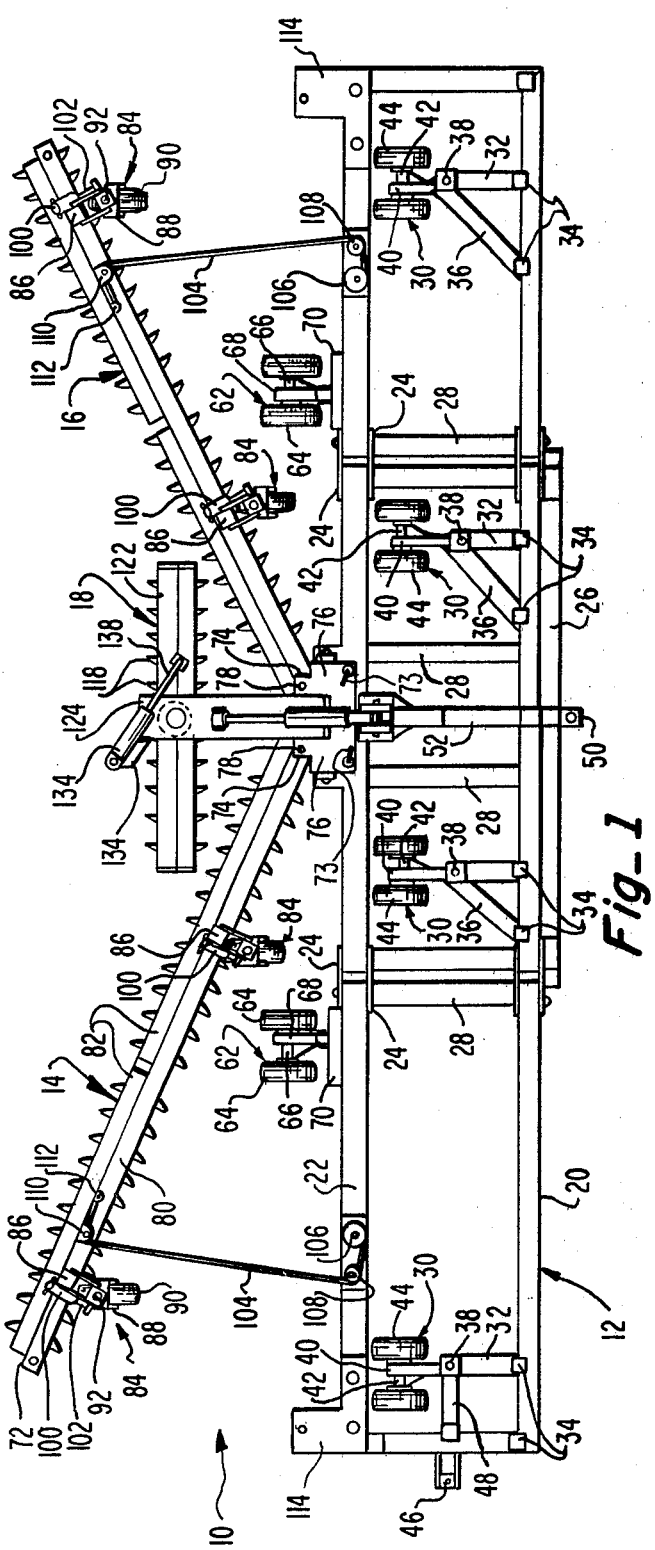
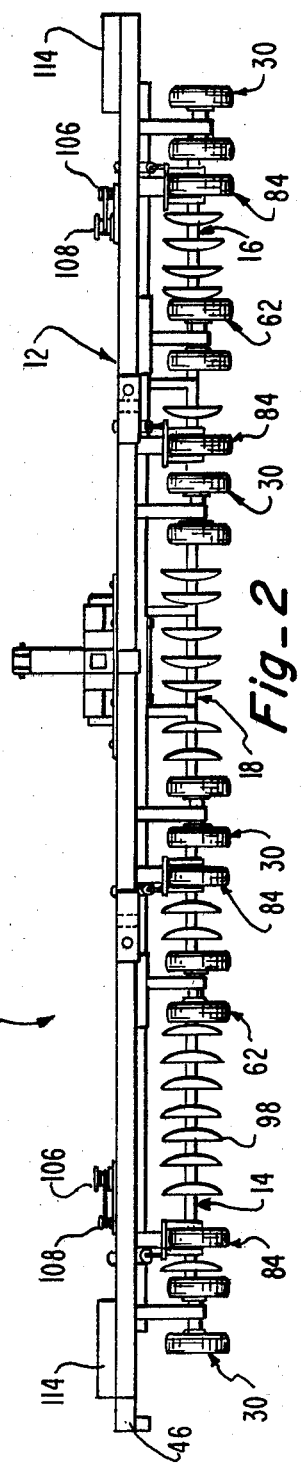
Fig_1
Fig_2

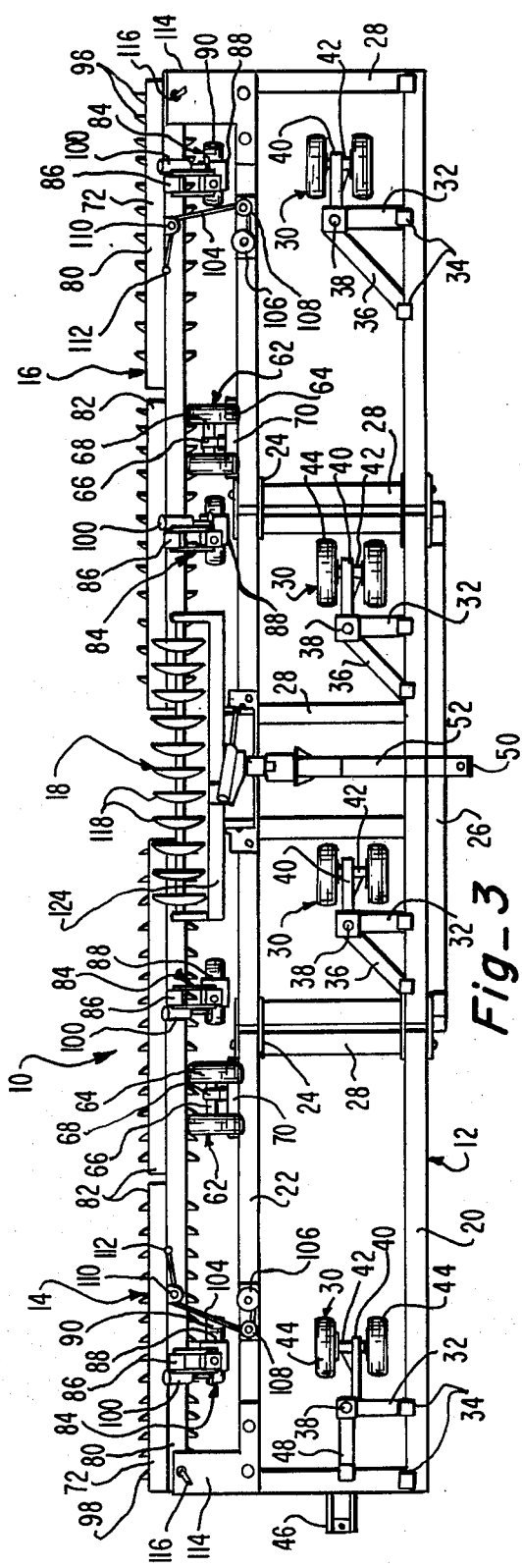
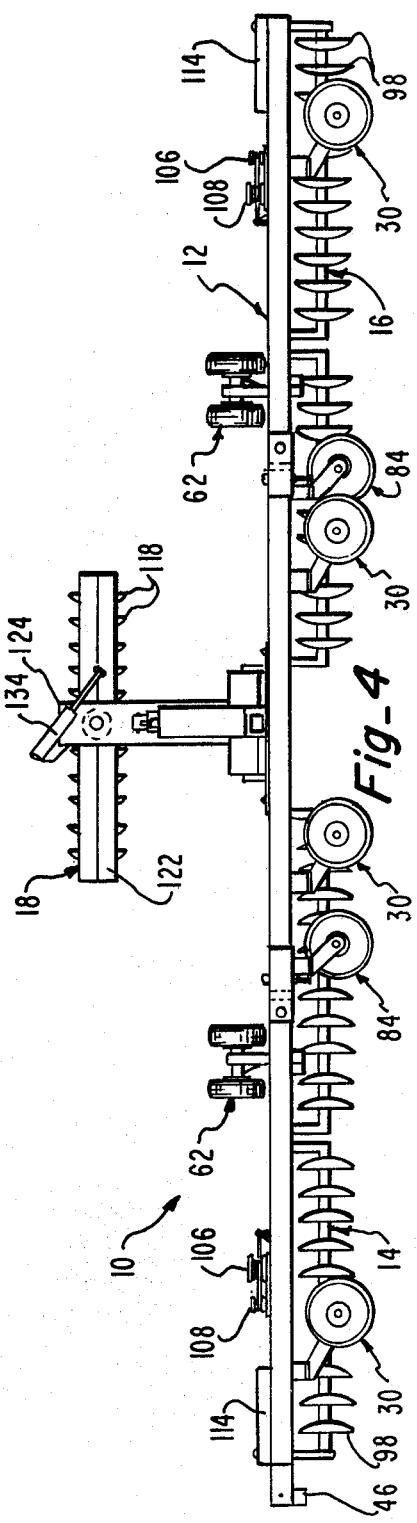

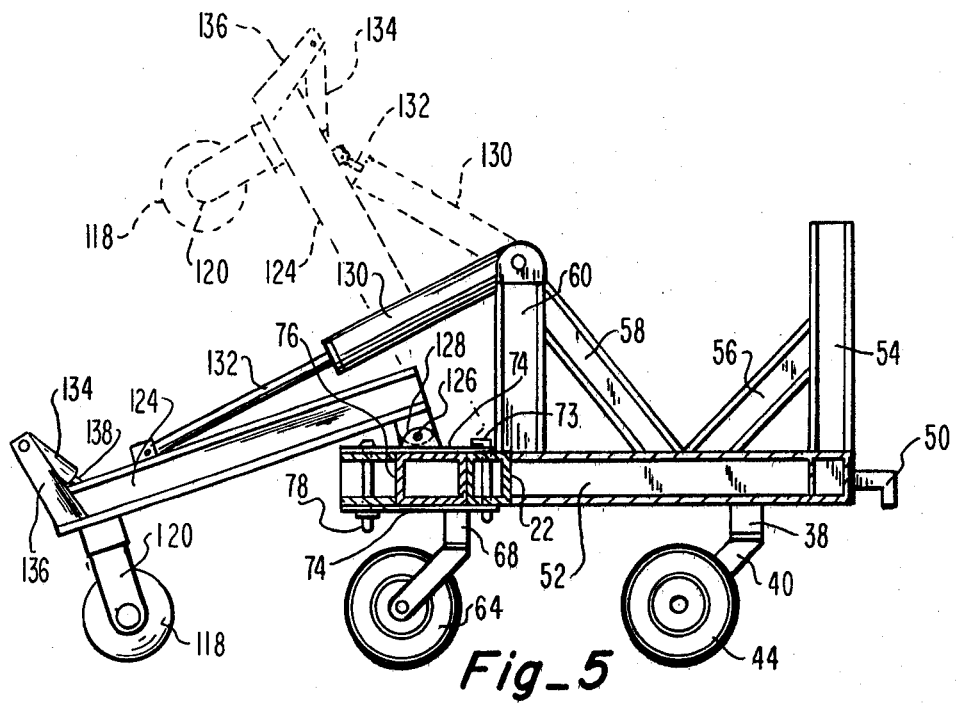
Fig_5
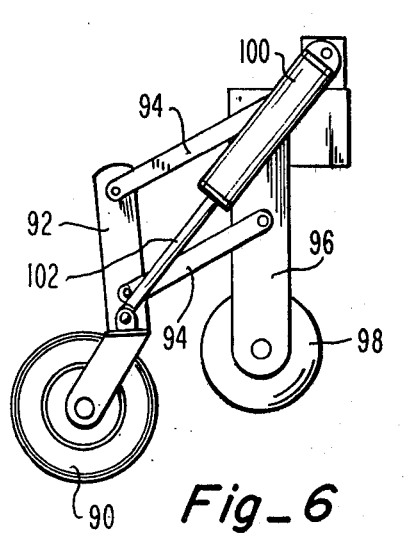
Fig_6
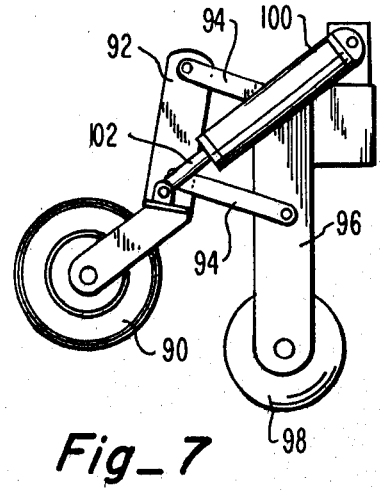
Fig_7

DISCING TOOL POSITIONABLE TO BE TRANSPORTED

DESCRIPTION

TECHNICAL ART

The present invention relates to a disc harrow tool and, in particular, to a multiple ganged disc apparatus which disc harrows wide portions of land during operation.

BACKGROUND OF THE INVENTION

Efficiency in farming operations demands greater sized farm implements. Such large machinery does, however, present a number of problems. Often times it is extremely difficult to transport the farm machinery because the considerable size of the machinery precludes transporting it on the highways. A solution to this particular problem is disclosed in U.S. Pat. No. 3,910,605 to Danford, the inventor of the discing tool described herein. This patent describes a hitching apparatus for attachment to various farming tools. In U.S. Pat. No. 3,901,327 to Mitchell, the same problem of transporting a relatively wide farm implement is addressed. The solution disclosed therein is directed to a discing tool having a number of disc gangs. Wheels are pivoted to movably support the tool in either its working or towing state. Additional discing tools are described in U.S. Pat. No. 3,918,527 to Fragen, et al. and U.S. Pat. No. 3,637,028 to Fueslein, et al. The discs disclosed therein provide for pivotal movement of disc gangs to further compact the tool when it is transported.

SUMMARY OF THE INVENTION

In accordance with the present invention, a discing tool is provided for tilling laterally extensive sections of soil and which comprises an elongated frame and a plurality of disc gangs. A pair of outer disc gangs are pivotally connected at first ends thereof to the frame adjacent its center portion. The second ends of the outer disc gangs are pivoted away from the frame when the discing tool is used to work the soil while positioned substantially parallel to the frame when the discing tool is transported. A center disc gang which is vertically pivotal is used to disc harrow the section of soil between the first ends of the outer two disc gangs.

More particularly, an elongated frame is provided comprising a hitch bar and a chassis member spaced from the hitch bar and joined thereto by a number of support members. A draft bar is connected to the frame and positioned adjacent the center portion of the elongated frame. A number of spaced swivel wheel assemblies are connected to the frame for movably supporting the same. A discing tongue extends generally perpendicularly from the chassis member for connection to a vehicle such as a tractor when the discing tool is used to till the soil. A towing tongue is connected to an end of the elongated frame and extends generally parallel thereto. The towing tongue is fastened to the tractor so that when transporting the discing tool the longitudinal axis of the elongated frame is generally parallel to the direction of travel of the tractor. A pair of outboard wheel assemblies are also pivotally mounted to the frame adjacent the hitching bar. The outboard wheel assemblies are lowered when the land is worked by the discing tool to provide additional support to the discing tool and facilitate movement thereof. A first disc gang having a plurality of discs for working the soil is pivotally connected at its first end to the center portion of the frame adjacent the hitch bar. The first disc gang extends in a first direction so that the second end of the disc gang is connectable to a first end of the frame. Similarly, a second disc gang having a plurality of discs for working the soil is pivotally connected at its first end to the center portion of the frame adjacent the hitch bar. The second disc gang extends in a second direction, opposite that of the first disc gang, so that the second end of the second disc gang is connectable to a second end of the frame. A number of disc wheel assemblies are connected to the first and second disc gangs for support thereof. A center disc gang having a plurality of discs is connected to a center plate which is joined to the mid portin of the hitch bar. The center disc gang is vertically pivotal so that, when the discing tool is working the land, the center disc gang is positioned between the first and second disc gangs to till the soil section which is not worked by the first and second disc gangs. When the discing tool is transported, the center disc gang is moved along a generally vertical arcuate path and positioned generally above the frame.

From the foregoing description, the present invention provides a number of worthwhile advantages. A discing tool is provided which works a relatively wide portion of land. Consequently, extensive lateral strips of land can be worked during a single pass or sweep of the tool. The discing implement has pivotal disc gangs to further reduce the width thereof during transporting while extending at an angle relative to the frame during the working operation. A vertically pivotal center disc gang assures that the section of soil between the outer disc gangs is also worked while being positioned above the frame when the tool is transported. The vertical extension of the center disc gang, when positioned for travel on a highway however, is not considerable so that the discing tool readily moves under overpasses and the like. Furthermore, the frame includes two tongues for connection to the pulling vehicle, depending upon whether the discing tool is working the ground or being transported to another location.

BRIEF DESCRIPTION OF THE DRAWINGS

FIG. 1 is a top plan view of the discing tool showing the disc gangs in a working position;

FIG. 2 is a side elevational view of the discing tool showing the disc gangs in working position with the wheels positioned for movement in a direction generally perpendicular to the longitudinal axis of the frame;

FIG. 3 is a top plan view of the discing tool showing the disc gangs in a position for transporting the discing tool in a direction parallel to the longitudinal axis of the frame;

FIG. 4 is a side elevational view of the discing tool showing the disc gangs in the transporting position with the wheels positioned for movement in a direction generally parallel to the longitudinal axis of the frame and the center disc gang vertically raised above the frame;

FIG. 5 is an enlarged, fragmentary, lateral section showing details of the center disc gang connected to the frame of the disc tool with the center disc gang shown in a raised position using a dotted line configuration;

FIG. 6 is an enlarged, fragmentary, lateral section showing the discs in a raised position when transported; and FIG. 7 is an enlarged, fragmentary, lateral section, similar to FIG. 6, but showing the discs in a lowered position for working the soil.

DESCRIPTION OF THE PREFERRED EMBODIMENT

In accordance with this invention, a discing tool 10 is provided comprising an elongated frame 12 and a plurality of disc gangs, including first outer disc gang 14, second outer disc gang 16, and center disc gang 18. The disc gangs can be positioned in a working state in which the discs engage the ground or soil or in a nonworking or transporting state in which the discs are positioned for travel and do not engage the surface over which they are moved. FIGS. 1 and 2 depict the discing tool 10 in the working state while FIGS. 3 and 4 illustrate the discing tool 10 in the transporting state. As can be seen, frame 12 includes an elongated chassis member 20 spaced from but connected to an elongated hitch bar 22. Both the chassis member 20 and the hitch bar 22 could comprise a number of separate portions joined together by attaching members 24. Attaching members 24 are, for example, sheets of metal interconnecting the ends of two adjacent portions of chassis member 20 or hitch bar 22 by means of bolts inserted through the metal sheets and the end portions. Additional strength to the frame 12 along its center portion is provided by support rod 26 which is substantially parallel to chassis member 20 and connected thereto by conventional means such as bolts. The chassis member 20 and hitch bar 22 are fastened together by a plurality of stress members 28 which extend laterally between them and are spaced from each other to provide a unitary frame structure.

A plurality of midwheel assemblies 30 are connected to the chassis member 20 and positioned between the chassis member 20 and the hitch bar 22 in order to support the frame 12 above the surface over which the discing tool 10 is positioned and facilitate the movement thereof. Consequently, the distance between the chassis member 20 and the hitch bar 22 is chosen so that the midwheel assemblies 30 are operably contained therebetween while the distance between stress members 28 is sufficient to permit swiveling of the midwheel assemblies 30, as will be explained later. Four midwheel assemblies 30 are shown in position between stress members 28 to provide the aforementioned support. Each midwheel assembly 30 includes a lateral support member 32 which extends for a portion of the distance between chassis member 20 and hitch bar 22. The lateral support member 32 is fastened to the chassis member 20 using a joining member 34 which is welded or bolted to chassis member 20. Three of the four wheel assemblies 30 include a diagonal support member 36 which is connected to the chassis member 20 also using a joining member 34. Diagonal chassis support member 36 extends diagonally from chassis member 20 and is connected to lateral support member 32 at an end opposite the end connected to chassis member 20. A shaft 38 extends in a vertical direction through an opening formed in that end of lateral support member 32 which is joined to the diagonal support member 36. Shaft 38 is connected at an end, opposite the end joining together lateral support member 32 and diagonal support member 36, to an axle support bar 40 which extends generally parallel to lateral support member 32 but positioned therebelow. Axle support bar 40 joins with axle 42 between which a pair of pneumatic tires 44 are supported on wheels. The shaft 38 pivots in the opening in the lateral support member 32 through an angle of at least 90°. This pivotal movement permits the midwheel assemblies 30 to be rotated so that, as seen in FIG. 2, the tires 44 are positioned for movement in a direction such that the disc gangs are able to properly work the soil, this direction is generally perpendicular to the longitudinal axis of frame 12. Alternatively, in the nonworking state as seen in FIG. 4, the tires 44 of the midwheel assemblies 30 can be rotated and positioned for movement in a direction parallel to the longitudinal axis of the frame 12. Consequently, when the frame 12 is transported on the highway, for example, the longitudinal axis of the elongated frame 12 is parallel to the direction of movement and the width of the discing tool 10 is minimized so that the discing tool 10 properly fits within the lane of travel.

As previously noted, one of the midwheel assemblies 30 does not include a diagonal support member 36. Rather this midwheel assembly 30, which is located at the end of the frame adjacent towing tongue 46, includes a parallel support member 48 joined to a lateral support member 32. Parallel support member 48 is essentially parallel to the longitudinal axis of frame 12 and is connected to a stress member 28. This connection permits the midwheel assembly 30 to be located more adjacent the end of the frame 12 having towing tongue 46 and thereby assures proper support of the frame 12. Towing tongue 46 is attached to a stress member 28 lcoated at the end of frame 12 by connection means such as welding and extends generally parallel to the longitudinal axis of frame 12. A towing vehicle, such as a tractor, is hitched to the towing tongue 46 when the discing tool 10 is transported in its nonworking state.

A discing tongue 50 is joined to the support rod 26 and extends generally perpendicularly to the longitudinal axis of the frame 12 for connection to the towing vehicle to pull the discing tool 10 during its working state. A draft bar 52 is connected between chassis member 20 and hitch bar 22 while substantially axially aligned with the discing tongue 50. Draft bar 52 underlies and supports a plurality of braces which in turn support the center disc gang 18, as best illustrated in FIG. 5. The support braces include a first vertical brace 54 connected to the draft bar 52 adjacent discing tongue 50 and chassis member 20. A first diagonal brace 56 is attached to the top end of the first vertical brace 54 and extends diagonally away from the discing tongue 50 and is connected to the draft bar 52. A second diagonal brace 58 is connected to the draft bar 52 adjacent the end of first diagonal brace 56 which is connected to draft bar 52 and extends diagonally upward. A second vertical brace 60 is attached to second diagonal brace 58. Second vertical brace 60 is substantially parallel to first vertical brace 54 and is connected to second diagonal brace 58 adjacent hitch bar 22. The braces are joined to each other and draft bar 52 using conventional means such as welds or bolts.

Further support to frame 12 is provided by pivotal outboard wheel assemblies 62 which are connected to the hitch bar 22 along the side thereof further away from the chassis member 20 and outwardly of frame 12. Outboard wheel assemblies 62, similar to midwheel assemblies 30, each include a pair of wheels and pneumatic tires 64 interconnected by an axle 66. The axle 66 is fastened to shank 68 which extends vertically and is pivotally connected to a pin member 70 about which outboard wheel assembly 62 rotates along a vertical path, unlike midwheel assemblies 30 each of which swivel along a horizontal path. Each pin member 70 is mounted on hitch bar 22. When the discing tool 10 is working the land, outboard wheel assemblies 62 are positioned so that tires 64 contact the ground and give additional moving support to the frame 12 and the disc gangs. When the discing tool 10 is transported, outboard wheel assemblies 62 are pivoted until the tires 64 are above hitch bar 22. Although not depicted, the outboard wheel assemblies 62 can be pivoted by means of hydraulics or pulleys and cables fastened thereto and the hitch bar 22.

Attached to the frame 12 are the disc gangs 14, 16 and 18. The first outer disc gang 14 is of a length equal to approximately one half the length of hitch bar 22 while the second outer disc gang 16 is also of a length equal to approximately one half the length equal to approximately one half the length of the hitch bar 22. The first and second outer disc gangs 14, 16 are pivotally connected at their first ends to the frame 12 adjacent the center or mid portion thereof. The second ends of first and second outer disc gangs 14, 16 are extendable in substantially opposite directions so that the length of the two outer disc gangs 14, 16 together substantially equals the length of the frame 12. Inasmuch as the structure of the two outer disc gangs 14, 16 are identical while being symmetrically positioned about an axis coinciding with draft bar 52, only the first outer disc gang 14 will be described in detail. It is readily apparent that such a structural description will also apply to second outer disc gang 16.

The first outer disc gang 14 includes an elongated wing portion 72 having a first end which is held between a pair of sheets 74 of bracket 76. Sheets 74 are connected to opposing sides of hitch bar 22 at the mid portion thereof adjacent draft bar 52. Rods 73 inserted through aligned holes of sheets 74 and hitch bar 22 join first and second outer disc gangs 14, 16 and center disc gang 18 to frame 12. It is understood that rods 73 can be readily removed to disconnect frame 12 from the first and second outer disc gangs 14, 16 and center disc gang 18. As a consequence, farm implements other than the disc harrow are attachable to frame 12. The first end of wing portion 72 has a hole through which a pivot member 78 is inserted as well as being inserted through apertures in the sheets 74 which are aligned with the hole. The wing portion 72 extends in a direction away from the mid portion of the frame 12. As indicated before, wing portion 72 is of a length which extends to the end of frame 12. Wing portion 72 includes a support beam 80 and a pair of disc rods 82 which are joined contiguously to the support beam 80. A pair of pivotal disc wheel assemblies 84 support the first outer disc gang 14. Each of the pivotal disc wheel assemblies 84 are fastened to a mountaing plate 86. Each of the mounting plates 86 is connected to the top of the support beam 80. The two disc wheel assemblies 84 are spaced from each other to properly support the first outer disc gang 14. The disc wheel assembly 84 includes a clevis 88 holding a pneumatic tire 90. A vertical support bar 92 is attached to the clevis 88. A pair of swivel rods 94 interconnect the vertical support bar 92 and a hanger 96. Hanger 96 joins the discs 98 to the disc rods 82, as best illustrated in FIGS. 6 and 7. A hydraulic cylinder 100 is fastened to each of the mounting plates 86 while its movable rod 102 is connected to vertical support bar 92 adjacent tire 90. As seen in FIG. 6, when the discing tool 10 is transported and is in its nonworking state, movable rod 102 is extended so that tire 90 is vertically below discs 98 such that discs 98 are above the surface over which the discing tool moves. Consequently, no contact is made between the surface and discs 98. Alternatively, activation of the hydraulic cylinder 100 so that movable rod 102 is in its retracted position causes the swivel rods 94 to pivot above their attachment points on vertical support bar 92. The completed pivoting action, as shown in FIG. 7, results in the tires 90 being raised vertically relative to the discs 98 while the discs 98 contact the ground surface which is to be tilled by the discs 98. Accordingly, the discing tool 10 is positioned in the working state for disc harrowing the soil as the discing tool 10 is moved. In addition to changing the position of the tires 90 in a vertical direction, the interconnection of clevis 88 and vertical support bar 92 permits the rotation of tires 90 through an angle of at least 90° along an axis through the tire 90 center. Consequently, just like midwheel assemblies 30, tires 90 can be rotated for movement in a direction either parallel to the longitudinal axis of the frame 12 so that the outer disc gangs 14, 16 are movably supported in the transporting state or perpendicular to the longitudinal axis of the frame 12 so that the outer disc gangs 14, 16 are movable supported in the working state.

As discussed previously, the first outer disc gang 14 pivots about pivot member 78 at its first end. To vary the angle or position of first disc gang 14 relative to the frame 12, a cable 104 connected between hitch bar 22 and first outer disc gang 14 is either extended to increase the angle or retracted to decrease the angle therebetween. A winch 106 is mounted on the hitch bar 22 between the disc wheel assemblies 84 and adjacent that disc wheel assembly 84 which is located near the second end of first outer disc gang 14. A sheave 108 is mounted on the hitch bar 22 adjacent the winch 106 to receive the cable 104 therethrough. The cable 104 extends through a pulley 110 attached to the support beam 80 and is connected to tie point 112 on the support beam 80. Thus, use of winch 106 enables the cable 104 to be wound therearound to draw first outer disc gang 14 more adjacent hitch bar 22 or, cable 104 can be unwound to permit pivotal movement of first outer disc gang 14 away from hitch bar 22. FIG. 3 best illustrates the first outer disc gang 14 in its nonworking state wherein first outer disc gang 14 is generally parallel to the longitudinal axis of the frame 12. The second end of first outer disc gang 14 has a hole which is aligned with apertures in flange 114 so that locking pin 116 can be inserted through the aligned hole and apertures in flange 114 so that locking pin 116 can be inserted through the aligned hole and apertures to firmly hold first outer disc gang 14 adjacent hitch bar 22.

As described previously, a space remains between the first ends of the first outer disc gang 14 and the second outer disc gang 16. Consequently, a section of soil is not worked by the discs 98 of the first and second outer disc gangs 14, 16 when the discing tool 10 is pulled through the soil. In order that all portions of soil between the second ends of the first and second outer disc gangs 14, 16 be tilled during a single pass or sweep of the discing tool 10, the center disc gang 20 is positioned to disc harrow the soil between the first ends of the first and second outer disc gangs 14, 16. Center disc gang 20 includes a plurality of center discs 118 for cutting the soil. Center discs 118 are connected to center hangers 120 which are joined together by center disc rod 122 for connection to center plate 124. Center plate 124 has a width less than the length of the center disc rod 112.

Ends of center plate 124 are pivotally connected to the frame 12 by means of trunnion 126 which is supported in projections 128, as best seen in FIG. 5. Projections 128 are mounted on the center bracket 76. A vertical pivoting cylinder 130 hydraulically vertically raises and lowers the center plate 124. The vertical pivoting cylinder 130 is connected at a first end to the second vertical brace 60 while a movable extender 132 is hydraulically activated to pivot the center plate 124. Accordingly, when the discing tool 10 is in the working state, the movable extender 132 is extended to push the center plate 124 downwardly so that the center discs 118 contact the soil. In the nonworking state, movable extender 132 is retracted to pull the center plate 124 upwardly, as seen in FIG. 4, so that the center plate 124 is substantially at a right angle to the longitudinal axis of frame 12. It is apparent that, when it is desirable to disconnect first and second outer disc gangs 14, 16 and center disc gang 18 from frame 12, vertical pivoting cylinder 130 must be disengaged at one of its ends from either center plate 124 or second vertical brace 60. Additionally, a center disc cylinder 134 is connected to center disc gang 18 to tilt or adjust the position of the center disc gang 18 relative to the soil surface. For example, the land to be worked may be inclined so that it is necessary that one end portion of the center disc gang 18 be raised or lowered relative to the opposite end portion thereof in order that all sections of the land are properly tilled. The center disc cylinder 134 is connected to an upstanding arm 135 which is mounted on center plate 124. Center disc cylinder 134 includes a center rod 138 which is hydraulically movable within the center disc cylinder 134 and is fastened to the center disc gang 18. Extending the center rod 138 results in the end portion of the center disc gang 18 connected to the center rod 138 being lowered while the opposite end portion is raised. Conversely, retracting the center rod 138 results in the end portion of the center disc gang 18 being raised while the opposite end portion is lowered. Furthermore, it is easily appreciated that a pivoting pin or bolt can interconnect center plate 124 and center disc gang 18 at its mid portion so that the center disc gang 18 is pivotal about the pivoting pin.

Center plate 124 has a length such that when the discing tool is in the working state and outer discs 98 and center discs 118 contact the soil, center discs 118 are spaced behind those outer discs 98 adjacent the first end of first and second outer disc gangs 14, 16. Consequently, during the working of the soil no contact or interference between outer discs 98 and center discs 118 is possible; provided that, first and second outer disc gangs 14, 16 are pivoted through an angle relative to frame 12 so as not to contact center disc gang 18. It is readily understood that, the greater the angle between frame 12 and each of the outer disc gangs 14, 16, a greater length is required of center plate 124 so that there is no interference therebetween. However, it is desirable to minimize the height of center plate 124 so that when discing tool 10 is transported center plate 124 is of a height to permit passage thereof under bridges and like structures. Accordingly, the length of center plate 124 is chosen to permit outer disc gangs 14, 16 to be positioned at an angle for proper disc harrowing of the soil and yet able to easily be transported beneath overpasses.

In view of the foregoing description, a number of beneficial advantages are derived from the present invention. An extensively wide farm implement is provided for efficiently disc harrowing large portions of land in a relatively short time. The outer disc gangs are pivotally connected to a frame so that they can be moved to a number of working positions and also be positioned parallel with respect to the frame when the tool is transported. A center disc gang is vertically pivotal to work the soil between the two outer disc gangs so that all the soil between the ends of the two outer disc gangs is tilled after each pass of the discing tool. Furthermore, the length of the center plate joining the center disc gang to the frame is minimized to facilitate movement of the discing tool along a highway while assuring that the center disc gang does not interfere with the proper operation of the two outer disc gangs. The disc gangs are also readily detachable from the frame so that other farming tools are connectable to the frame.

The invention has been described in detail with reference to a particular embodiment thereof, however, it will be understood that various modifications can be effected within the spirit and scope of this invention.

I claim:

1. A discing tool for working wide portions of soil and also positionable to be transported on a highway, comprising:

an elongated frame having a longitudinal axis for attachment to a towing vehicle, said frame including an elongated hitch bar, an elongated chassis member parallel to said hitch bar but spaced therefrom, a draft bar joining said hitch bar and said chassis member together, and at least one vertical brace connected to said draft bar and extending upwardly therefrom;

a first outer disc gang having a length corresponding to substantially one-half the length of said frame and including a plurality of discs, said first outer disc gang having a first end pivotally connected to said frame adjacent the mid portion thereof and a second end extending in a first direction away from the mid portion of said frame;

a second outer disc gang having a length corresponding to substantially one-half the length of said frame and including a plurality of discs, said second outer disc gang having a first end pivotally connected to said frame adjacent the mid portion thereof and a second end extending in a second direction, substantially opposite the first direction of said first outer disc gang, away from the mid portion of said frame, the lengths of said first and second outer disc gangs together substantially corresponding to the length of said frame;

pivoting means connecting each of said first and second outer disc gangs to said frame adjacent said second ends of each of said first and second outer disc gangs to said frame adjacent said second ends of each of said first and second outer disc gangs so that said second ends are pivotal about each of said first ends so that when said discs are working the soil said outer disc gangs are positioned at an angle relative to said frame and when said discs are transported said outer disc gangs are generally parallel to said frame;

means for supporting said frame and said first and second outer disc gangs; and center disc gang means having a plurality of center discs, said center disc gang means being connected to said frame adjacent the mid portion thereof, said center discs being used to work the soil between the first ends of said first and second outer disc gangs, said center disc gang means further including a center disc rod on which said center discs are mounted, the length of said center disc rod being substantially less than the length of said first outer disc gang, a trunnion fastened to said frame to permit the rotating of said center disc gang means above said frame, a center plate interconnecting said center disc rod and said trunnion, and means interconnecting said vertical brace and said center plate for rotating said center plate along a vertical arcuate path.

2. The discing tool, as claimed in claim 1, wherein:
said center disc gang means is vertically pivotal so that when said discing tool is working the soil said center discs engage the soil and when the discing tool is transported said center disc gang means is positioned above said frame.

3. The discing tool, as claimed in claim 1, wherein:
said supporting means includes a plurality of midwheel assemblies having wheels swingably connected to said frame such that said wheels are rotatable through an angle of at least 90° so that the discing tool can be towed in a direction parallel to the longitudinal axis of said frame when the discing tool is transported.

4. The discing tool, as claimed in claim 1, wherein said supporting means includes:
a plurality of outboard wheel assemblies having wheels, said wheels vertically pivotal to permit movement thereof above said frame.

5. The discing tool, as claimed in claim 1, wherein said supporting means includes:
a plurality of disc wheel assemblies having wheels connected to said first and second disc gangs and including means for lifting said discs relative to said wheels so that said discs are positioned above the surface when the discing tool is transported.

6. The discing tool, as claimed in claim 1, wherein said pivoting means includes:
a winch connected to said frame;
a pulley connected to said first outer disc gang; and
a cable extending between said winch and said pulley so that said second end of said first outer disc gang is pivoted away from said frame when the length of said cable is increased between said winch and said pulley and said second end of said first outer disc gang is pivoted towards said frame when the length of said cable is decreased between said winch and said pulley.

7. A discing tool for working wide portions of land and also positionable to be transported on a highway, comprising:
an elongated frame having a longitudinal axis for attachment to a vehicle, said frame including an elongated chassis member, an elongated hitch bar spaced from said chassis member and a plurality of stress members interconnecting said chassis member and said hitch bar to form a unitary structure;
a plurality of midwheel assemblies connected to said chassis member, each of said midwheel assemblies having a pair of wheels rotatable through an angle of at least 90° so that said frame is movable in a direction parallel to the longitudinal axis of said frame as well as perpendicular to the longitudinal axis of said frame, said midwheel assemblies being positioned between said chassis member and said hitch bar;
a plurality of outboard wheel assemblies having wheels pivotally connected to said hitch bar and extending outwardly of said frame, each of said outboard wheel assemblies vertically pivotal so that said wheels are positioned above said frame when the discing tool is transported;
a draft bar extending transversely between said hitch bar and said chassis member at the mid portions thereof and connected thereto;
a plurality of braces connected to said draft bar and extending upwardly therefrom;
a center plate pivotally mounted on said hitch bar adjacent said draft bar;
means connected between said center plate and one of said braces for rotating said center plate along a vertical arcuate path;
a pair of center brackets connected to said hitch bar, said center brackets being symmetrically positioned about said draft bar;
a first outer disc gang having a length corresponding to substantially one-half of the length of said frame and including a plurality of discs, said first outer disc gang having a first end pivotally connected to said hitch bar adjacent the mid portion thereof and a second end extending in a first direction away from the mid portion of said hitch bar;
a second outer disc gang having a length corresponding to substantially one-half the length of said hitch bar and including a plurality of discs, said second outer disc gang having a first end pivotally connected to said hitch bar adjacent the mid portion thereof and a second end extending in a second direction away from the mid portion of said frame;
a pivot member pivotally connecting each of said first ends of said first and second outer disc gangs to said center brackets so that said first and second outer disc gangs are pivotable thereabout;
a pair of winches connected adjacent opposite ends of said hitch bar;
a pulley connected to each of said first and second outer disc gangs adjacent an end thereof;
a cable extending between each of said winches and each of said pulleys so that said second ends of said first and second outer disc gangs are pivoted away from said hitch bar when the lengths of said cables are increased between said winches and said pulleys and said second ends of said first and second outer disc gangs are pivoted toward said hitch bar when the lengths of said cables are decreased between said winches and said pulleys; and
a center disc gang connected to said center plate having a plurality of center discs to engage the land between said first ends of said first and second outer disc gangs but positioned above said frame when the discing tool is transported.

* * * * *